US009627968B2

(12) United States Patent
Tadamasa

(10) Patent No.: US 9,627,968 B2
(45) Date of Patent: Apr. 18, 2017

(54) STEP-DOWN CHOPPER TYPE SWITCHING POWER-SUPPLY DEVICE

(71) Applicant: Sanken Electric Co., LTD., Niiza-shi, Saitama (JP)

(72) Inventor: Yoshimichi Tadamasa, Niiza (JP)

(73) Assignee: Sanken Electric Co., Ltd., Niiza-shi, Saitama (JP)

( * ) Notice: Subject to any disclaimer, the term of this patent is extended or adjusted under 35 U.S.C. 154(b) by 57 days.

(21) Appl. No.: 14/717,187

(22) Filed: May 20, 2015

(65) Prior Publication Data

US 2016/0344288 A1 Nov. 24, 2016

(51) Int. Cl.
*G05F 1/40* (2006.01)
*H02M 3/156* (2006.01)
*H02M 1/36* (2007.01)
*H02M 1/00* (2006.01)

(52) U.S. Cl.
CPC ............. *H02M 3/156* (2013.01); *H02M 1/36* (2013.01); *H02M 2001/0006* (2013.01); *H02M 2001/0022* (2013.01)

(58) Field of Classification Search
CPC ........... H05B 33/0818; H05B 33/0851; H02M 3/156; H02M 3/1582; H02M 2001/007
USPC ........ 315/186, 224, 291, 294, 307; 323/222, 323/267, 282, 283, 285
See application file for complete search history.

(56) References Cited

U.S. PATENT DOCUMENTS

| | | | | |
|---|---|---|---|---|
| 5,138,249 A * | 8/1992 | Capel | ................ | H02M 3/1582 323/283 |
| 6,580,258 B2 * | 6/2003 | Wilcox | ................ | H02M 3/156 323/272 |
| 8,207,717 B2 * | 6/2012 | Uruno | ................ | H02M 1/4208 323/225 |
| 8,278,896 B2 * | 10/2012 | Horii | ................ | H02M 3/158 323/271 |
| 8,669,721 B2 * | 3/2014 | Watanabe | ........ | H05B 33/0818 315/224 |

* cited by examiner

*Primary Examiner* — Rajnikant Patel
(74) *Attorney, Agent, or Firm* — Banner & Witcoff, Ltd.

(57) ABSTRACT

A step-down chopper type switching power-supply device includes a step-down chopper circuit including an inductor connected to a switching element connected to a DC power source, a regenerative-voltage detecting circuit, a control circuit controlling the switching element such that regenerative voltage becomes a reference voltage, an auxiliary power supply circuit charging a capacitor by using the regenerative voltage and supplying the voltage of the capacitor as power-supply voltage to the control circuit, and a activation circuit stopping supply of current to the capacitor after activation of the auxiliary power supply circuit, wherein, after activation of the auxiliary power supply circuit, in a case where voltage supplied from the DC power source is equal to or less than a first threshold value, the activation circuit performs control by the voltage supplied from the DC power source, such that current is supplied to the capacitor.

5 Claims, 7 Drawing Sheets

STEP-DOWN CHOPPER TYPE SWITCHING POWER-SUPPLY DEVICE

TECHNICAL FIELD

The present invention relates to a step-down chopper type switching power-supply device which performs output voltage control by a switching operation.

BACKGROUND ART

As a switching power-supply device which performs output voltage control by a switching operation, a step-down chopper type switching power-supply device is known.

The step-down chopper type switching power-supply device includes: a series circuit of a switching element which is connected to a DC power source and a diode; a series circuit which includes an inductor and a capacitor and is connected to both ends of the diode; a control IC (integrated circuit), which detects the regenerative voltage of the inductor in an OFF period of the switching element and controls the switching element based on an error voltage between the detected regenerative voltage and a reference voltage such that the regenerative voltage of the inductor becomes the reference voltage; and an auxiliary power supply circuit which supplies power-supply voltage to the control IC by using the regenerative voltage of the inductor in the OFF period of the switching element.

SUMMARY

In the step-down chopper type switching power-supply device, the ratio (ON duty) of an ON period to a switching cycle of the switching element is determined according to the ratio (Vo/Vin) of output voltage Vo, which is supplied to a load, to input voltage Vin, which is supplied from the DC power source. In short, as the input voltage Vin decreases, the ON duty increases. In other words, if the ON period ratio of the switching element is compared with the ratio of a period when the regenerative current of the inductor flows, the ON period ratio of the switching element is large.

As the ON duty increases, the period when the regenerative current of the inductor flows shortens. For this reason, the step-down chopper type switching power-supply device becomes a state in which energy which is supplied from the auxiliary power supply circuit to the control IC decreases. As a result, in order to compensate a decrease in energy, the ON duty is set to be larger. In this case, under a lightly loaded condition close to an unloaded condition, the relation between the power-supply voltage which is supplied from the auxiliary power supply circuit and the output voltage breaks down. Since the ON duty becomes larger, energy supplied to the output side through the switching element and the inductor becomes too large. As a result, the output voltage rises.

Therefore, in a case where the input voltage Vin instantaneously drops to a small value, for example, in a case where a connection of the step-down chopper type switching power-supply device and a commercial AC power source is released, whereby supply of the input voltage is stopped, the output voltage rises. Since the output voltage rises like this, there is a possibility that the output voltage will affect a load circuit which is connected to the step-down chopper type switching power-supply device.

The present invention was made in view of the above described circumstances, and an object of the present invention is to provide a step-down chopper type switching power-supply device capable of suppressing a rise in output voltage in a case where input voltage drops.

A step-down chopper type switching power-supply device of this disclosure includes: a step-down chopper circuit, which includes a switching element connected to a DC power source and an inductor connected to the switching element; a regenerative-voltage detecting circuit, which detects the regenerative voltage of the inductor in an OFF period of the switching element; a control circuit, which performs on-off control on the switching element based on an error voltage between a reference voltage and the regenerative voltage detected by the regenerative-voltage detecting circuit such that the regenerative voltage of the inductor becomes the reference voltage; an auxiliary power supply circuit, which charges a capacitor by using the regenerative voltage of the inductor in the OFF period of the switching element and supplies the voltage of the capacitor as power-supply voltage to the control circuit; and a activation circuit, which supplies current to the capacitor by voltage supplied from the DC power source upon activation of the control circuit and stops supply of current to the capacitor after activation of the auxiliary power supply circuit, wherein after activation of the auxiliary power supply circuit, if the voltage supplied from the DC power source becomes equal to or less than a first threshold value, the activation circuit performs control such that current is supplied to the capacitor by the voltage supplied from the DC power source.

According to the present invention, it is possible to provide a step-down chopper type switching power-supply device capable of suppressing a rise in output voltage in a case where input voltage drops.

DETAILED DESCRIPTION

Hereinafter, an embodiment of the present invention will be described with reference to the drawings.

Figure 1:
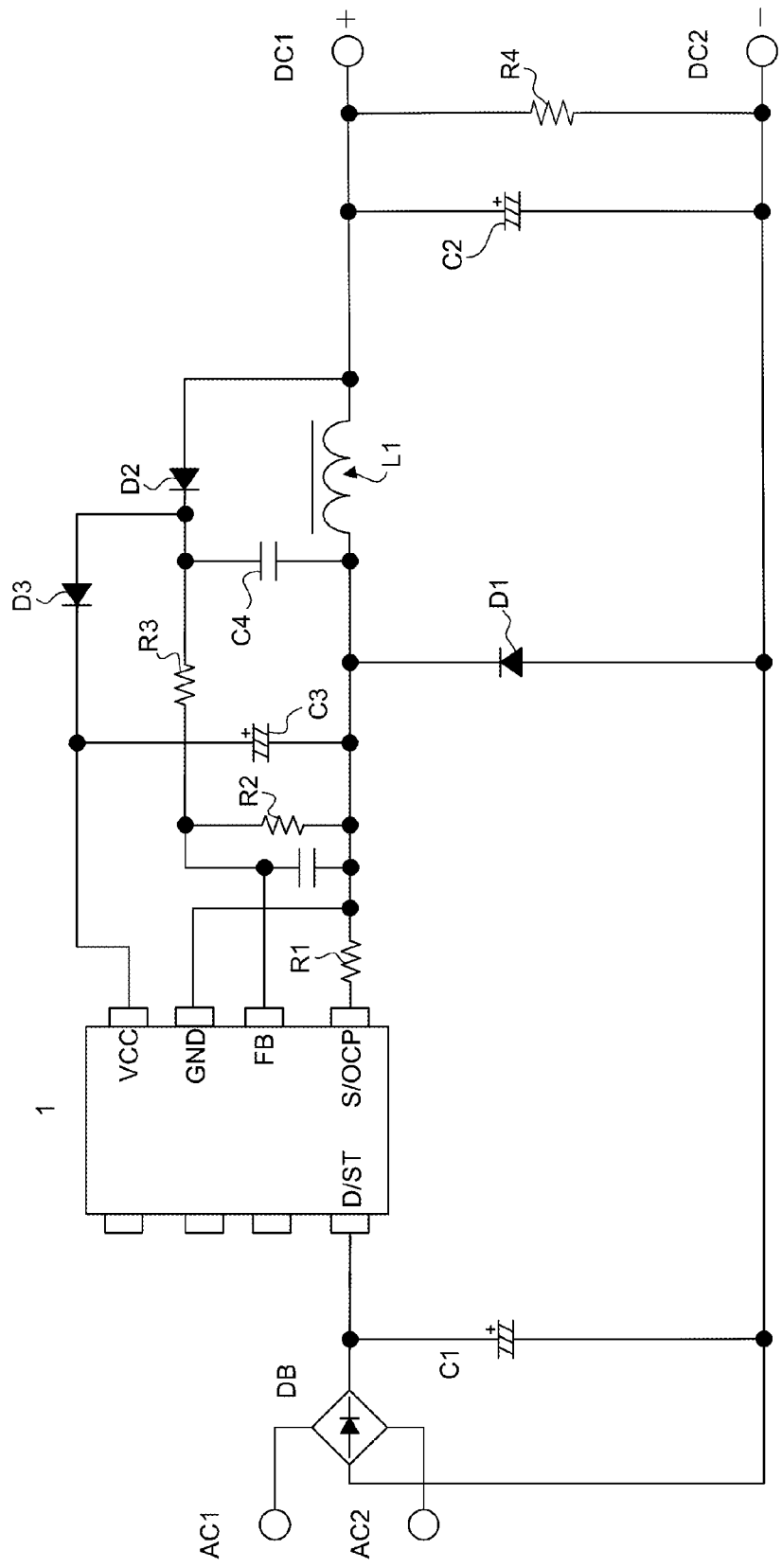
FIG. 1 is a circuit diagram illustrating the internal configuration of a step-down chopper type switching power-supply device of an embodiment of the present invention.

FIG. 1 is a circuit diagram illustrating the internal configuration of a step-down chopper type switching power-supply device of an embodiment of the present invention.

Figure 2:
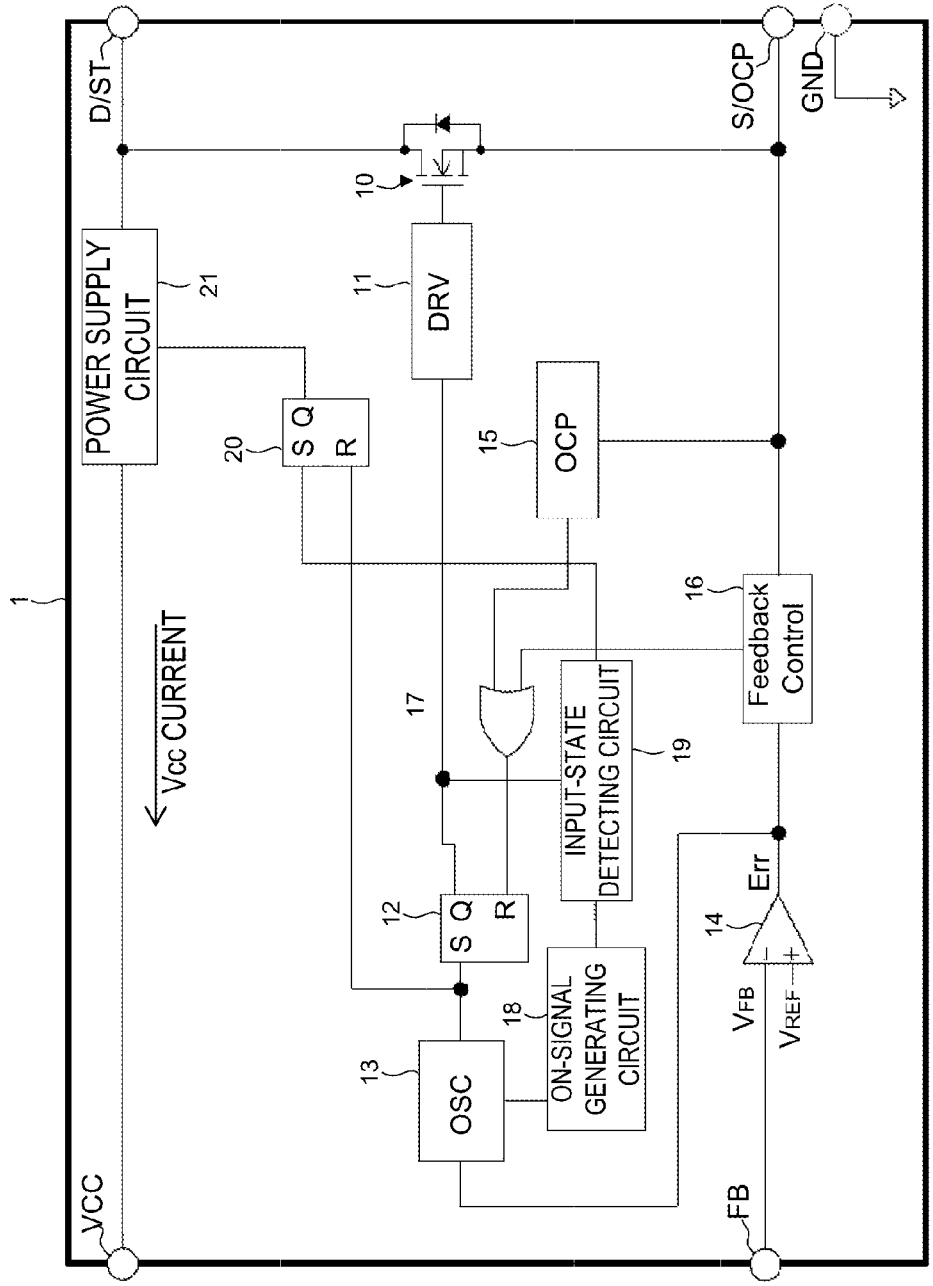
FIG. 2 is a circuit diagram illustrating the internal configuration of a control circuit 1 shown in FIG. 1.

FIG. 2 is a circuit diagram illustrating the internal configuration of a control circuit 1 shown in FIG. 1.

The step-down chopper type switching power-supply device of FIG. 1 includes: a DC power source which includes a rectifier circuit DB and a smoothing capacitor C1; a step-down chopper which includes a MOSFET (Metal Oxide Semiconductor Field Effect Transistor) 10 which is a switching element connected to the DC power source, an inductor L1, a diode D1, and a capacitor C2; a regenerative-voltage detecting circuit which includes a diode D2, a capacitor C4, a resistor R3, and a resistor R2 and detects the regenerative voltage of the inductor L1 in an OFF period of the MOSFET 10; a control circuit 1 which performs on-off control on the MOSFET 10 based on an error voltage between the regenerative voltage $V_{FB}$ which is detected by the regenerative-voltage detecting circuit and a reference voltage $V_{REF}$ such that regenerative voltage of the inductor L1 becomes the reference voltage $V_{REF}$; an auxiliary power supply circuit which includes the diode D2, the diode D3, and a capacitor C3, and charges the capacitor C3 by using the regenerative voltage of the inductor L1 in the OFF period of the MOSFET 10, and supplies the voltage of the capacitor C3 as power-supply voltage to the control circuit 1; and a bleeder resistor R4.

To AC input terminals AC1 and AC2 of the rectifier circuit DB having a bridge configuration of diodes, a commercial AC power source is connected. AC voltage input from the commercial AC power source is subjected to full-wave rectification and is output from the rectifier circuit DB.

Between the positive rectified-output terminal of the rectifier circuit DB and the negative output terminal DC2 of the switching power-supply device, the smoothing capacitor C1 is connected. Also, the negative rectified-output terminal of the rectifier circuit DB is connected to the negative output terminal DC2 of the switching power-supply device. As a result, AC voltage which is supplied from the commercial AC power source is rectified and smoothed by the rectifier circuit DB and the smoothing capacitor C1, whereby DC voltage is obtained.

The control circuit 1 has a D/ST (MOSFET drain/starting current input) terminal, to which the DC voltage obtained by rectifying-and-smoothing the AC voltage by the rectifier circuit DB and the smoothing capacitor C1 is input, an S/OCP (MOSFET source/overcurrent protection) terminal, a VCC (power-supply voltage input) terminal, an FB (feedback signal input) terminal, and a GND (ground) terminal.

As shown in FIG. 2, the control circuit 1 includes the MOSFET 10. The drain terminal of the MOSFET 10 is connected to the D/ST terminal, and the source terminal of the MOSFET 10 is connected to the S/OCP terminal.

As shown in FIG. 1, to the S/OCP terminal of the control circuit 1, one end of a resistor R1 is connected. The other end of the resistor R1 is connected to the GND terminal of the control circuit 1 and is also connected to one end of the inductor L1. The other end of the inductor L1 is connected to the positive output terminal DC1 of the switching power-supply device.

The resistor R1 is a voltage detection resistor for detecting current which flows in the MOSFET 10 as a voltage signal $V_{OCP}$.

Between the connection node of the resistor R1 and the inductor L1 and the negative output terminal DC2, the diode D1 is connected. Between the connection node of the inductor L1 and the positive output terminal DC1 and the negative output terminal DC2, the capacitor C2 is connected.

A step-down chopper circuit is configured by a series circuit which includes the MOSFET 10, the resistor R1, and the diode D1 and is connected to the DC power source including the rectifier circuit DB and the smoothing capacitor C1, and a series circuit which includes the inductor L1 and the capacitor C2 and is connected to both ends of the diode D1. As the components of the step-down chopper circuit, widely known components can be used. For example, the diode D1 may be configured by a switching element.

The bleeder resistor R4 is connected between the positive output terminal DC1 and the negative output terminal DC2 of the switching power-supply device.

To both ends of the inductor L1, a series circuit of the diode D2 and the capacitor C4 is connected. In an OFF period of the MOSFET 10, the regenerative current of the inductor L1 is supplied to the capacitor C4 through the diode D2.

To both ends of the capacitor C4, a series circuit of the resistor R3 and the resistor R2 is connected. To the connection node of the resistor R3 and the resistor R2, the FB terminal of the control circuit 1 is connected. The voltage of the capacitor C4 is input as the regenerative voltage $V_{FB}$ of the inductor L1 to the FB terminal by resistance division of the resistor R3 and the resistor R2.

To both ends of the inductor L1, a series circuit of the diode D2, the diode D3, and the capacitor C3 is also connected. In an OFF period of the MOSFET 10, the regenerative current of the inductor L1 is supplied to the capacitor C3 through the diode D2 and the diode D3.

The connection node of the capacitor C3 and the diode D3 is connected to the VCC terminal of the control circuit 1, and the connection node of the capacitor C3 and the inductor L1 is connected to the GND terminal of the control circuit 1. As a result, the voltage of the capacitor C3 is supplied as power-supply voltage Vcc of the control circuit 1 to the control circuit 1.

Subsequently, the internal configuration of the control circuit 1 will be described.

The control circuit 1 includes the MOSFET 10, a driver (DRV) 11 which controls the gate of the MOSFET 10, an RS flip-flop (RS-FF) 12, an oscillator (OSC) 13, an error amplifier 14 which amplifies the difference between the regenerative voltage $V_{FB}$ which is supplied to the FB terminal and the reference voltage, thereby outputting an error voltage Err, an overcurrent sensing circuit (OCP) 15, a feedback control circuit 16, an OR circuit 17, an ON-signal generating circuit 18, an input-state detecting circuit 19, and a activation circuit which is configured by an RS flip-flop (RS-FF) 20 and a power supply circuit 21.

The feedback control circuit 16 performs feedback control on the duty ratio of the MOSFET 10 based on the error voltage Err.

Specifically, the feedback control circuit 16 compares the error voltage Err which is output from the error amplifier 14, with the voltage signal $V_{OCP}$ which is input to the S/OCP terminal, and outputs a high-level signal in a case where the voltage signal $V_{OCP}$ is equal to or higher than the error voltage Err.

The OCP 15 compares the voltage signal $V_{OCP}$ and an overcurrent threshold value, and outputs a high-level signal in a case where the voltage signal $V_{OCP}$ reaches the overcurrent threshold value.

The OR circuit 17 outputs a high-level signal if a high-level signal from any one of the OCP 15 and the feedback control circuit 16 is input.

The RS-FF 12 has a reset terminal R to which the output signal of the OR circuit 17 is input, and a set terminal S to which a pulse signal having a predetermined frequency is input from the OSC 13. The output terminal Q of the RS-FF 12 is connected to the DRV 11.

If a high-level signal is output from the output terminal Q of the RS-FF 12, the DRV 11 turns on the MOSFET 10; whereas if a low-level signal is output from the output terminal Q of the RS-FF 12, the DRV 11 turns off the MOSFET 10.

A reset timing of the RS-FF 12 is determined by the output signal of the feedback control circuit 16. As described above, the control circuit 1 performs on-off control on the MOSFET 10 based on the error voltage Err such that the regenerative voltage of the inductor L1 becomes the reference voltage $V_{REF}$.

The OSC 13 receives the error voltage Err, and generates the pulse signal having the predetermined frequency according to the magnitude of the error voltage Err, and inputs the generated pulse signal to the set terminal S of the RS-FF 12 and a reset terminal R of the RS-FF 20. According to the frequency of this pulse signal, the switching frequency of the MOSFET 10 is determined.

The OSC 13 acts as a switching-frequency control circuit which controls the switching frequency according to the error voltage Err.

Figure 3:
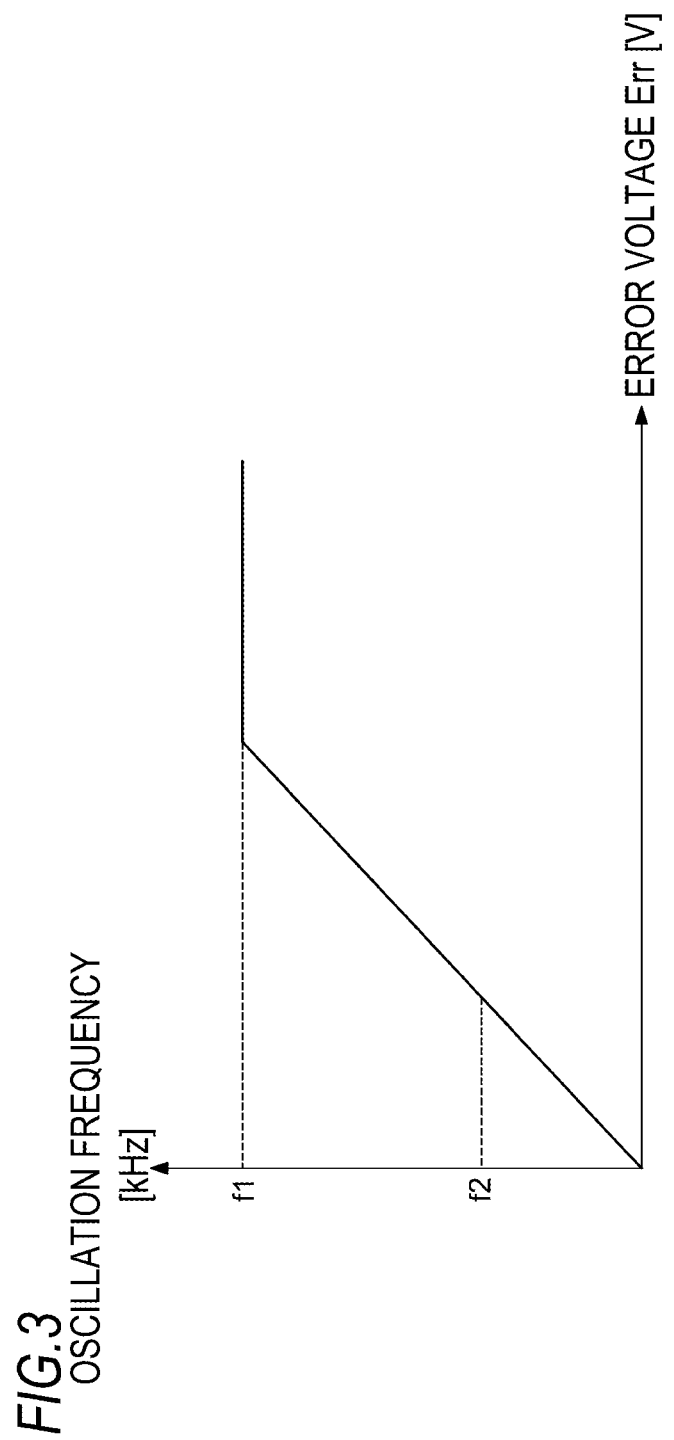
FIG. 3 is a view illustrating an example of the relation between an error voltage Err [V] and the oscillation frequency [kHz] of an oscillator (OSC) 13.

FIG. 3 is a view illustrating an example of the relation between the error voltage Err [V] and the oscillation frequency [kHz] of the OSC 13. As shown in FIG. 3, as the error voltage Err increases, the oscillation frequency of the OSC 13 increases.

The ON-signal generating circuit 18 generates an ON signal which transitions to a high level at each rising timing of the pulse signal which is generated by the OSC 13 and transitions to a low level if a predetermined time elapses from the corresponding rising timing, and outputs the generated ON signal to the input-state detecting circuit 19.

The input-state detecting circuit 19 is a circuit for determining the magnitude of the input voltage Vin which is input to the D/ST terminal of the control circuit 1 (the voltage which is supplied from the DC power source which includes the rectifier circuit DB and the smoothing capacitor C1).

As described above, in the step-down chopper type switching power-supply device, the ratio (ON duty) of an ON period to a switching cycle of the MOSFET 10 is determined according to the ratio (Vo/Vin) of output voltage Vo, which is supplied to a load, to the input voltage Vin. If the input voltage Vin decreases, the ON duty increases, and thus an ON period of the MOSFET 10 lengthens.

By using this, the input-state detecting circuit 19 determines whether the input voltage Vin is equal to or less than a first threshold value, or not, based on the length of an ON period of the MOSFET 10.

A state where the input voltage Vin is equal to or less than the first threshold value means a state where the physical connection of the AC input terminals AC1 and AC2 and the commercial AC power source has been broken, a state where supply of AC voltage from the commercial AC power source has been interrupted, for example, due to a blackout, and so on.

A state where the input voltage Vin is larger than the first threshold value means a state where the AC input terminals AC1 and AC2 and the commercial AC power source are in a physical connection state and thus AC voltage is being supplied from the commercial AC power source to the switching power-supply device.

The input-state detecting circuit 19 receives the signal which is output from the output terminal Q of the RS-FF 12, and the ON signal which is output from the ON-signal generating circuit 18, and compares them.

In a case where a period when the signal which is output from the output terminal Q of the RS-FF 12 is at the high level (that is, an ON period of the MOSFET 10) exceeds a period when the ON signal is at the high level, the input-state detecting circuit 19 detects that the input voltage Vin has become the first threshold value or less, and inputs the high-level signal to the set terminal S of the RS-FF 20.

The power supply circuit 21 is connected between the D/ST terminal and the VCC terminal. Upon activation of the control circuit 1, the power supply circuit 21 supplies current to the capacitor C3 through the VCC terminal, according to the input voltage Vin which is supplied from the D/ST terminal, thereby activating the auxiliary power supply circuit which includes the diode D2, the diode D3, and the capacitor C3. After the auxiliary power supply circuit is activated by charging of the capacitor C3, the power supply circuit 21 stops supply of current to the capacitor C3.

Also, although not shown, to the VCC terminal of the control circuit 1, a regulator for supplying electric power to each unit the control circuit 1 is connected, and after activation of the auxiliary power supply circuit, by supply voltage of the regulator operating by the voltage of the capacitor C3, the control circuit 1 operates.

Also, after activation of the auxiliary power supply circuit, in a period when the output signal of the output terminal Q of the RS-FF 20 is at the high level, the power supply circuit 21 performs control such that current is supplied to the capacitor C3 through the VCC terminal according to the input voltage Vin which is supplied from the D/ST terminal.

A period when the ON signal which is generated by the ON-signal generating circuit 18 transitions to the high level (the above-mentioned predetermined time) is set to the maximum time which can be set as an ON period of the MOSFET 10 in a case where the magnitude of a load which is connected between the output terminals DC1 and DC2 of the switching power-supply device is equal to or greater than a second threshold value (during a heavy load).

Since this time is set, in a case where a load which is connected between the output terminals DC1 and DC2 of the switching power-supply device is a heavy load, the high-level signal cannot be output from the input-state detecting circuit 19, and after activation of the auxiliary power supply circuit, the power supply circuit 21 is not operated.

In short, only in a case where the magnitude of a load which is connected between the output terminals DC1 and DC2 of the switching power-supply device is less than the second threshold value, after activation of the auxiliary power supply circuit, if the input voltage Vin becomes equal to or less than the first threshold value, the power supply circuit 21 starts to operate.

Hereinafter, an operation of the switching power-supply device shown in FIG. 1 will be described.

Figure 4:
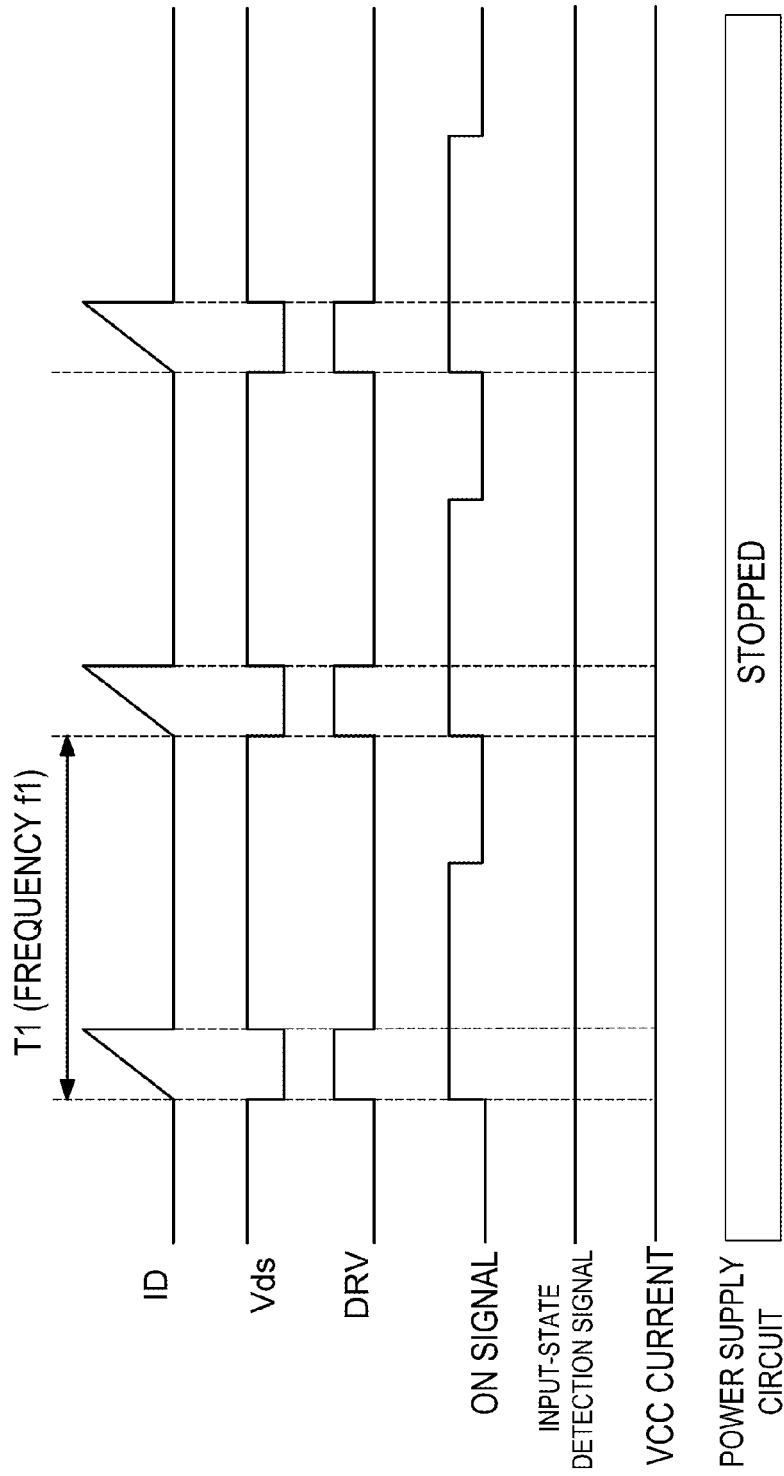
FIG. 4 is a timing chart for explaining an operation of the switching power-supply device shown in FIG. 1 in a normal state during a heavy load (when a load is equal to or greater than a second threshold value).

FIG. 4 is a timing chart for explaining an operation of the switching power-supply device shown in FIG. 1 in the normal state during a heavy load (in a case where a load is equal to or greater than the second threshold value).

In FIG. 4, "ID" represents the drain current of the MOSFET 10. "Vds" represents the voltage between the drain and source of the MOSFET 10. "DRY" represents a drive signal which is output from the DRV 11. "INPUT-STATE DETECTION SIGNAL" represents the output signal of the input-state detecting circuit 19. "VCC CURRENT" represents current which is supplied from the power supply circuit 21 to the capacitor C3.

Figure 5:
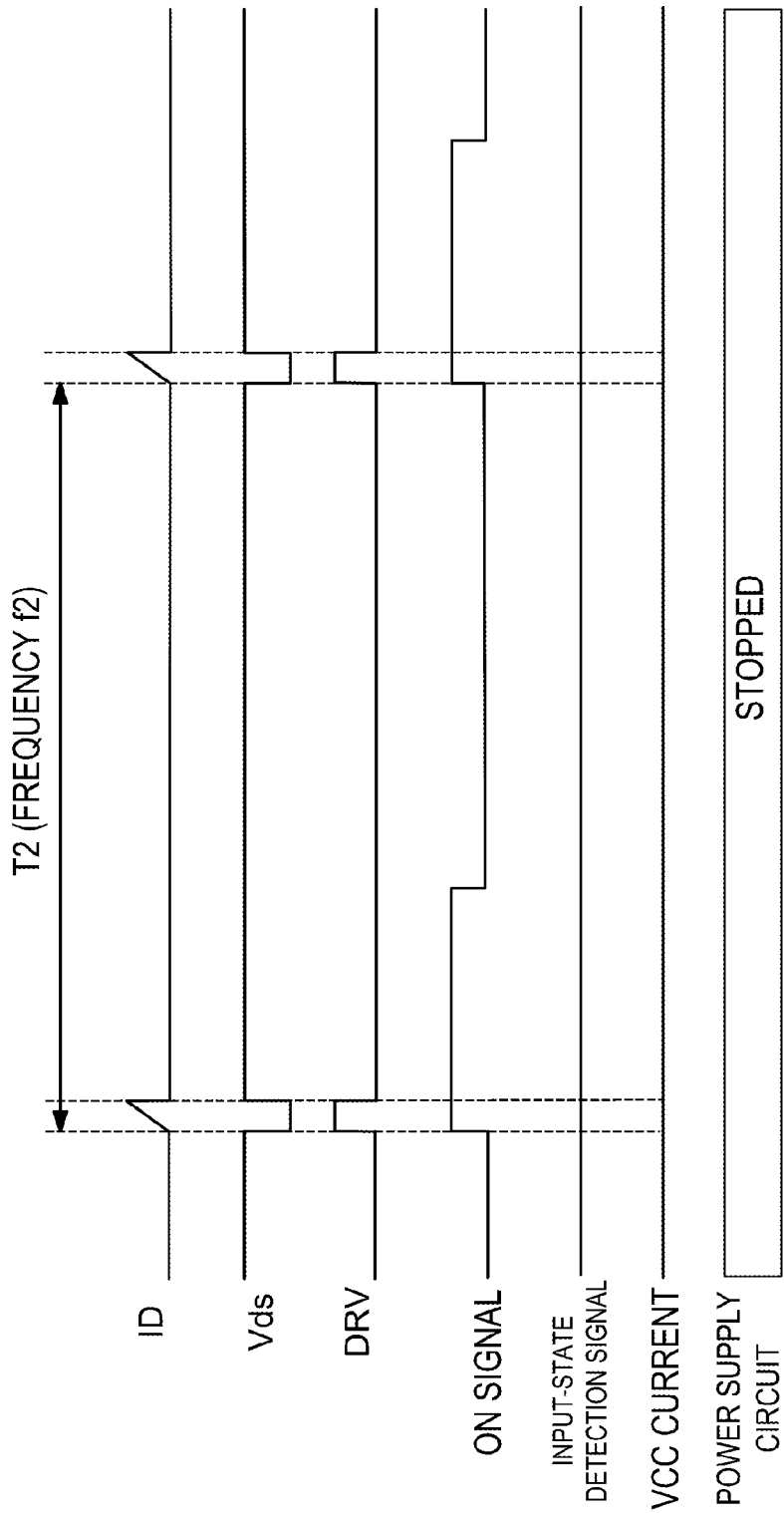
FIG. 5 is a timing chart for explaining an operation of the switching power-supply device shown in FIG. 1 in the normal state during a light load (when a load is less than the second threshold value).

FIG. 5 is a timing chart for explaining an operation of the switching power-supply device shown in FIG. 1 in the normal state during a light load (in a case where a load is less than the second threshold value).

Figure 6:
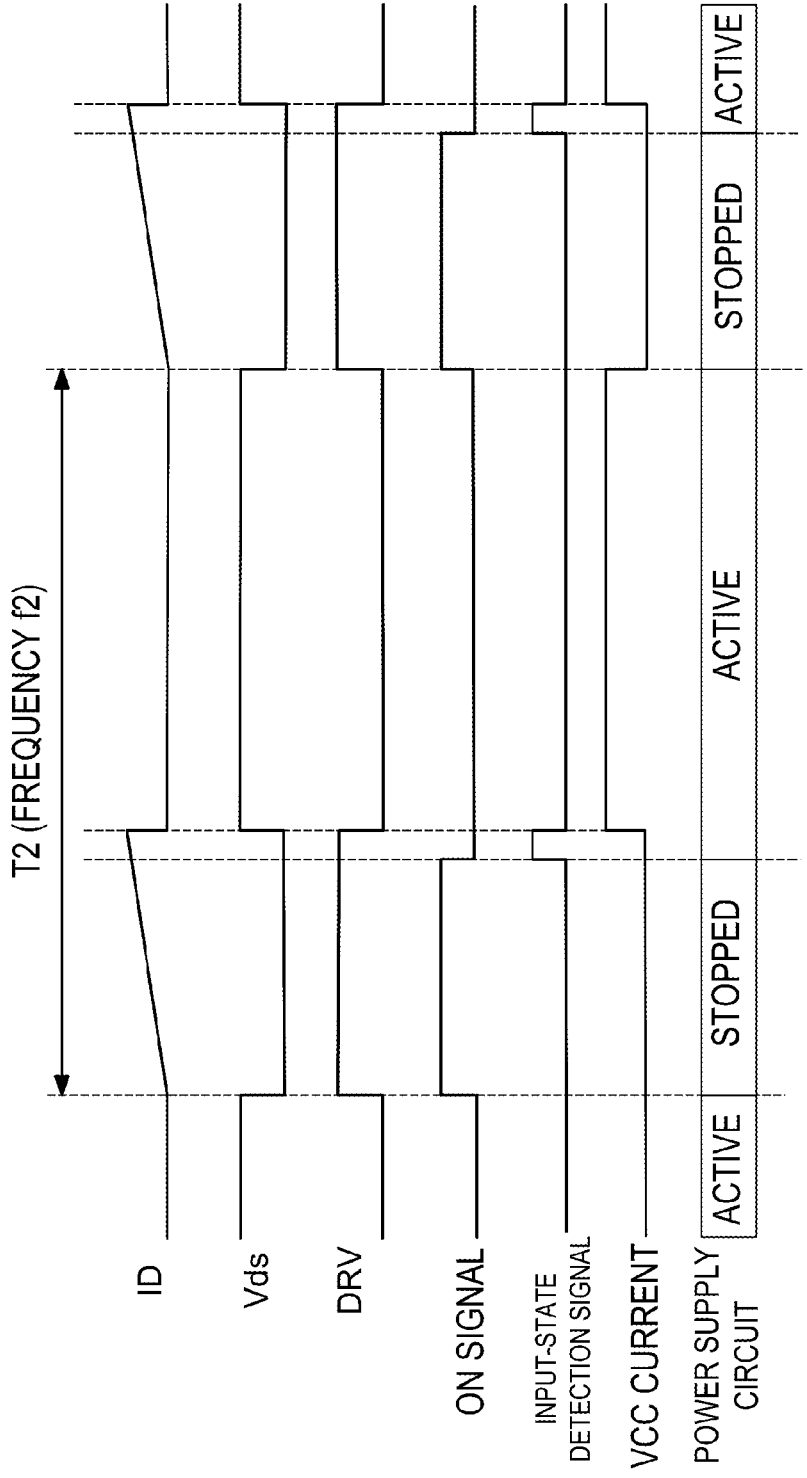
FIG. 6 is a timing chart for explaining an operation of the switching power-supply device shown in FIG. 1 in a state where an input voltage Vin is equal to or less than a first threshold value during a light load (a load is less than the second threshold value).

FIG. 6 is a timing chart for explaining an operation of the switching power-supply device shown in FIG. 1 in a state where the input voltage Vin is equal to or less than the first threshold value during a light load (in a case where a load is less than the second threshold value).

If the commercial AC power source is connected to the AC input terminals AC1 and AC2 and DC voltage is supplied to the D/ST terminal of the control circuit 1, the power supply circuit 21 of the control circuit 1 supplies current to the capacitor C3, thereby activating the auxiliary power supply circuit, and then the power supply circuit 21 stops. If the auxiliary power supply circuit is activated, by the voltage of the capacitor C3, electric power is supplied to each unit of the control circuit 1, and switching control on the MOSFET 10 starts.

During a heavy load period when a load which is connected to the switching power-supply device is equal to or greater than the second threshold value, since the error voltage Err increases, the oscillation frequency of the OSC 13 increases based on the relation shown in FIG. 3. FIG. 4 shows a timing chart in a case where the oscillation frequency becomes f1. FIGS. 5 and 6 show timing charts in a case where the oscillation frequency becomes f2.

As shown in FIG. 4, if the drive signal of the DRV 11 transitions to a high level according to a switching cycle T1, the ON signal which is generated by the ON-signal generating circuit 18 also transitions to the high level. A high-level period of the ON signal is set to the maximum value of an ON period of the MOSFET 10 in a case where a load is equal to or greater than the second threshold value.

As a result, in the state of FIG. 4, an ON period of the MOSFET 10 does not exceed a high-level period of the ON signal. Also, even in the state of FIG. 5, since a load becomes less than the second threshold value and the switching frequency decreases and thus the ON duty cannot change, an ON period of the MOSFET 10 does not exceed a high-level period of the ON signal. Therefore, during a switching operation, the input-state detection signal is maintained at a low level, and the power supply circuit 21 is maintained at a stopped state.

Meanwhile, as shown in FIG. 6, if the input voltage Vin decreases, the ON duty increases. As a result, an ON period of the MOSFET 10 exceeds a high-level period of the ON signal.

If an ON period of the MOSFET 10 exceeds a high-level period of the ON signal, the input-state detection signal transitions to the high level, and the high-level signal is input from the RS-FF 20 to the power supply circuit 21. If this high-level signal is input, the power supply circuit 21 is activated and starts to charge the capacitor C3.

Thereafter, if the ON period of the MOSFET 10 finishes, the input-state detecting circuit 19 returns the input-state detection signal to the low level. Also, the signal which is input to the reset terminal R of the RS-FF 20 transitions to the low level. As a result, the output of the RS-FF 20 is held, and thus the power supply circuit 21 continues to operate.

After the ON period of the MOSFET 10 finishes, if the MOSFET 10 is turned on again, the signal which is input to the reset terminal R of the RS-FF 20 transitions to the high level. As a result, the output of the RS-FF 20 transitions to the low level, and thus the power supply circuit 21 stops operating. In a state where there is a decrease in the input voltage Vin, this operation is repeatedly performed.

As described above, according to the switching power-supply device of FIG. 1, if the input voltage Vin decreases, the ON duty increases and then an ON period of the MOSFET 10 exceeds a high-level period of the ON signal, it is possible to charge the capacitor C3 by the power supply circuit 21. As a result, it becomes possible to supply sufficient energy from the power supply circuit 21 to the control circuit 1 in a case where regenerative energy from the inductor L1 is insufficient, and thus it is possible to mostly suppress a rise in the output voltage immediately before the input voltage Vin becomes zero.

Also, it becomes possible to reduce a loss of the bleeder resistor R4 for suppressing a rise in the output voltage, and thus it is possible to reduce standby power of the switching power-supply device.

Also, after activation of the control circuit 1, only in a case where the input voltage Vin decreases, the power supply circuit 21 is activated. As a result, it is possible to reduce a loss of the control circuit 1 in the normal state and suppress heat generation, as compared to a method of always generating circuit current of the control circuit 1 from the input voltage Vin.

Also, even if the power supply circuit 21 is activated when the input voltage Vin is equal to or less than the first threshold value, since the input voltage Vin has become a small value, it is possible to minimize a loss of the control circuit 1.

In the operation of FIG. 6, even in an ON period of the MOSFET 10, the power supply circuit 21 is activated; however, in a state where the MOSFET 10 is on, current cannot be supplied from the power supply circuit 21 to the capacitor C3. For this reason, the switching power-supply device can be configured such that the power supply circuit 21 is activated only in a period when the MOSFET 10 is off.

In short, in FIG. 6, a period from when the input-state detection signal transitions from the high level to the low level to when the MOSFET 10 is turned on may be set as an active period of the power supply circuit 21. In this case, the input-state detecting circuit 19 may input the high-level signal to the RS-FF 20 when an ON period of the MOSFET 10 exceeds a high-level period of the ON signal and the ON period of the MOSFET 10 finishes.

According to this configuration, it is possible to reduce a loss attributable to the power supply circuit 21. Also, if activation of the power supply circuit 21 is synchronized with an operation of detecting the regenerative voltage when the MOSFET 10 is off, it becomes possible to stably detect the regenerative voltage of the inductor L1.

According to the switching power-supply device of FIG. 1, in a case where the magnitude of a load which is connected between the output terminals DC1 and DC2 is equal to or greater than the second threshold value, an ON period of the MOSFET 10 does not exceed a high-level period of the ON signal.

In short, only in a case where the magnitude of a load which is connected between the output terminals DC1 and DC2 is less than the second threshold value (a light load or no load), after activation of the auxiliary power supply circuit, if the input voltage Vin becomes equal to or less than the first threshold value, the power supply circuit 21 starts to operate. Therefore, it is possible to reduce the frequency of activation of the power supply circuit 21, and it is possible to suppress a loss of the control circuit 1.

Figure 7:
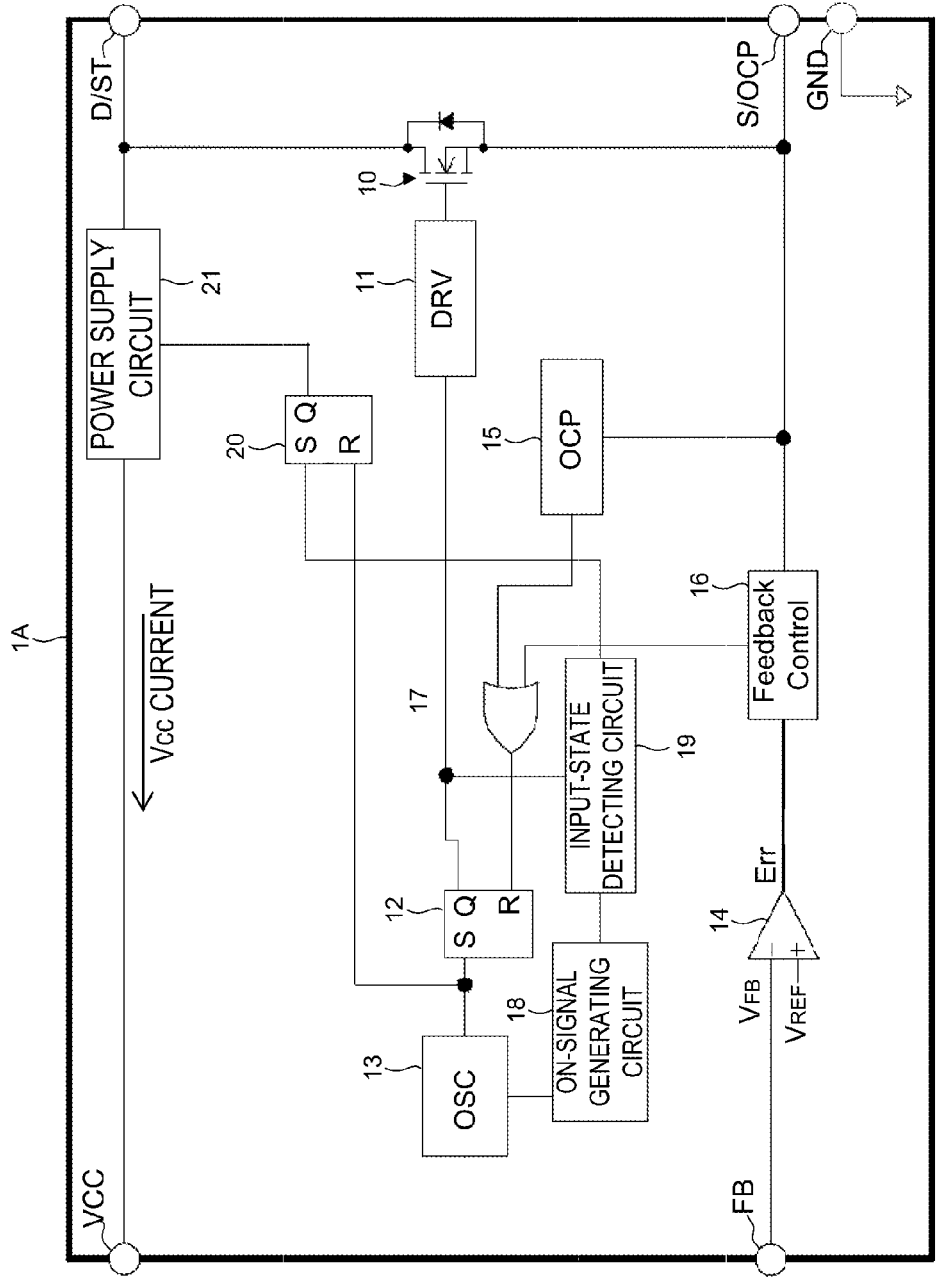
FIG. 7 is a circuit diagram illustrating the internal configuration of a control circuit 1A which is a modification of the control circuit 1 of the switching power-supply device shown in FIG. 1.

FIG. 7 is a circuit diagram illustrating the internal configuration of a control circuit 1A which is a modification of the control circuit 1 of the switching power-supply device shown in FIG. 1. The circuit 1A has the same configuration as that of the control circuit 1 except that the OSC 13 has a fixed oscillation frequency, not a variable oscillation frequency.

Even if the oscillation frequency is fixed, in a case where an ON period of the MOSFET 10 exceeds a high-level period of the ON signal, the power supply circuit 21 is activated, whereby it is possible to suppress a rise in the output voltage during decreasing of the input voltage Vin.

Although the present invention has been described with the specific embodiment, it goes without saying that the above described embodiment is an example and can be modified and implemented without departing from the scope of the present invention.

As having been described above, in this specification, there are disclosed the following items.

A disclosed step-down chopper type switching power-supply device of the present invention includes: a step-down chopper circuit, which includes a switching element connected to a DC power source and an inductor connected to the switching element; a regenerative-voltage detecting circuit, which detects the regenerative voltage of the inductor in an OFF period of the switching element; a control circuit, which performs on-off control on the switching element based on an error voltage between a reference voltage and the regenerative voltage detected by the regenerative-voltage detecting circuit such that the regenerative voltage of the inductor becomes the reference voltage; an auxiliary power supply circuit, which charges a capacitor by using the regenerative voltage of the inductor in the OFF period of the switching element and supplies the voltage of the capacitor as power-supply voltage to the control circuit; and a activation circuit, which supplies current to the capacitor by voltage supplied from the DC power source upon activation of the control circuit and stops supply of current to the capacitor after activation of the auxiliary power supply circuit, wherein after activation of the auxiliary power supply circuit, if the voltage supplied from the DC power source becomes equal to or less than a first threshold value, the activation circuit performs control such that current is supplied to the capacitor by the voltage supplied from the DC power source.

The disclosed step-down chopper type switching power-supply device further includes an input-state detecting circuit, which detects, in a case where an ON period of the switching element exceeds a predetermined time, that the voltage supplied from the DC power source is equal to or less than the first threshold value, wherein in a period from when it is detected by the input-state detecting circuit that the voltage which is supplied from the DC power source is equal to or less than the first threshold value to when the switching element transitions from an OFF state to an ON state, the activation circuit performs control such that current is supplied to the capacitor.

The disclosed step-down chopper type switching power-supply device further includes an input-state detecting circuit, which detects, in a case where an ON period of the switching element exceeds a predetermined time, that the voltage supplied from the DC power source is equal to or less than the first threshold value, wherein in a period from when it is detected by the input-state detecting circuit that the voltage which is supplied from the DC power source is equal to or less than the first threshold value and the switching element is turned off to when the switching element turned on, the activation circuit performs control such that current is supplied to the capacitor.

The disclosed step-down chopper type switching power-supply device further includes an input-state detecting circuit, which detects, in a case where an ON period of the switching element exceeds a predetermined time, that the voltage supplied from the DC power source is equal to or less than the first threshold value, wherein the predetermined time is set to the maximum value of an ON period of the switching element in a case where a load which is connected to the output of the step-down chopper circuit is equal to or greater than a second threshold value.

The disclosed step-down chopper type switching power-supply device further includes a switching-frequency control circuit, which controls the switching frequency of the switching element according to the error voltage.

What is claimed is:

1. A step-down chopper type switching power-supply device comprising:
    a step-down chopper circuit, which includes a switching element connected to a DC power source and an inductor connected to the switching element;
    a regenerative-voltage detecting circuit, which detects regenerative voltage of the inductor in an OFF period of the switching element;
    a control circuit, which performs on-off control on the switching element based on an error voltage between a reference voltage and the regenerative voltage detected by the regenerative-voltage detecting circuit such that the regenerative voltage of the inductor becomes the reference voltage;
    an auxiliary power supply circuit, which charges a capacitor by using the regenerative voltage of the inductor in the OFF period of the switching element and supplies voltage of the capacitor as power-supply voltage to the control circuit; and
    an activation circuit, which supplies current to the capacitor by voltage supplied from the DC power source upon activation of the control circuit and stops supply of current to the capacitor after activation of the auxiliary power supply circuit,
    wherein after activation of the auxiliary power supply circuit, if the voltage supplied from the DC power source becomes equal to or less than a first threshold value, the activation circuit performs control such that current is supplied to the capacitor by the voltage supplied from the DC power source.

2. The step-down chopper type switching power-supply device according to claim 1, further comprising:
    an input-state detecting circuit, which detects, in a case where an ON period of the switching element exceeds a predetermined time, that the voltage supplied from the DC power source is equal to or less than the first threshold value,
    wherein in a period from when it is detected by the input-state detecting circuit that the voltage which is supplied from the DC power source is equal to or less than the first threshold value to when the switching element transitions from an OFF state to an ON state, the activation circuit performs control such that current is supplied to the capacitor.

3. The step-down chopper type switching power-supply device according to claim 1, further comprising:
    an input-state detecting circuit, which detects, in a case where an ON period of the switching element exceeds a predetermined time, that the voltage supplied from the DC power source is equal to or less than the first threshold value, wherein in a period from when it is detected by the input-state detecting circuit that the voltage which is supplied from the DC power source is equal to or less than the first threshold value and the switching element is turned off to when the switching element is turned on, the activation circuit performs control such that current is supplied to the capacitor.

4. The step-down chopper type switching power-supply device according to claim 1, further comprising:

an input-state detecting circuit, which detects, in a case where an ON period of the switching element exceeds a predetermined time, that the voltage supplied from the DC power source is equal to or less than the first threshold value, wherein the predetermined time is set to a maximum value of an ON period of the switching element in a case where a load which is connected to an output of the step-down chopper circuit is equal to or greater than a second threshold value.

5. The step-down chopper type switching power-supply device according to claim 1, further comprising:

a switching-frequency control circuit, which controls a switching frequency of the switching element according to the error voltage.

\* \* \* \* \*